US008994316B2

(12) United States Patent
Asensio et al.

(10) Patent No.: US 8,994,316 B2
(45) Date of Patent: Mar. 31, 2015

(54) STEPPER MOTOR CONTROLLER

(75) Inventors: Rafael Cobas Asensio, Guadalajara (MX); Marco Antonio Santacruz Motte, Villingen-Schwenningen (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 219 days.

(21) Appl. No.: 13/503,306

(22) PCT Filed: Oct. 22, 2009

(86) PCT No.: PCT/US2009/061581
§ 371 (c)(1),
(2), (4) Date: Nov. 13, 2012

(87) PCT Pub. No.: WO2011/049568
PCT Pub. Date: Apr. 28, 2011

(65) Prior Publication Data
US 2013/0112133 A1  May 9, 2013

(51) Int. Cl.
*H02P 8/14* (2006.01)
*H02P 8/32* (2006.01)
*H02P 8/40* (2006.01)

(52) U.S. Cl.
CPC .................... *H02P 8/40* (2013.01)
USPC ...... 318/696; 318/562; 318/568.12; 318/628; 318/685

(58) Field of Classification Search
CPC ............. H02P 5/68; H02P 7/29; G01R 31/31; G06F 11/3652
USPC ......... 318/628.5, 568.12, 562, 685, 696, 139, 318/34; 463/6
See application file for complete search history.

(56) References Cited

U.S. PATENT DOCUMENTS

| 4,035,707 | A | * | 7/1977 | Debrie et al. ............... 318/628 |
| 4,038,590 | A | * | 7/1977 | Knowlton ................. 318/562 |
| 4,047,003 | A | * | 9/1977 | LaRocca et al. ............ 700/9 |
| 4,100,597 | A | * | 7/1978 | Fleming et al. ............ 700/169 |
| 4,282,468 | A | * | 8/1981 | Barker et al. ............. 318/608 |
| 4,289,997 | A | * | 9/1981 | Jung et al. ................. 318/113 |
| 4,353,016 | A | * | 10/1982 | Born ....................... 318/400.23 |
| 4,395,742 | A | * | 7/1983 | Ostroff ..................... 360/78.13 |
| 4,434,468 | A | * | 2/1984 | Caddick et al. ............. 701/49 |
| 4,463,426 | A | * | 7/1984 | Caddick et al. ............. 701/49 |
| 4,517,673 | A | * | 5/1985 | Brown et al. ............... 714/10 |
| 4,663,575 | A | * | 5/1987 | Juzswik et al. ............. 318/444 |
| 4,682,088 | A | * | 7/1987 | Sullivan .................... 318/568.1 |
| 4,706,194 | A | * | 11/1987 | Webb et al. ................. 701/49 |
| 4,817,948 | A | * | 4/1989 | Simonelli .................. 463/6 |

(Continued)

FOREIGN PATENT DOCUMENTS

DE 10 2006 062267 6/2008
DE 102006062267 6/2008

(Continued)

OTHER PUBLICATIONS

International Search Report and Written Opinion for International Application No. PCT/US2009/061581 dated Aug. 3, 2010.

*Primary Examiner* — Paul Ip

(57) ABSTRACT

A method for controlling multiple stepper motors with a single micro-controller output set uses a demultiplexer to split a single micro-controller output set into individual control signals for a plurality of stepper motors.

20 Claims, 3 Drawing Sheets

(56) References Cited

U.S. PATENT DOCUMENTS

| | | | | |
|---|---|---|---|---|
| 4,839,572 A * | 6/1989 | Steely | ............................ | 318/603 |
| 4,845,415 A * | 7/1989 | Steely | ........................ | 318/568.1 |
| 4,845,619 A * | 7/1989 | Steely et al. | ..................... | 701/49 |
| 4,874,996 A * | 10/1989 | Rosenthal | ...................... | 318/567 |
| 4,887,263 A * | 12/1989 | Steely | ........................... | 370/386 |
| 4,901,289 A * | 2/1990 | Cretin et al. | ..................... | 367/34 |
| 4,922,536 A * | 5/1990 | Hoque | .............................. | 381/2 |
| 4,931,712 A * | 6/1990 | DiGiulio et al. | ................. | 318/625 |
| 5,155,812 A * | 10/1992 | Ehlig et al. | ...................... | 710/59 |
| 5,194,794 A * | 3/1993 | Shamoto | ...................... | 318/603 |
| 5,200,676 A * | 4/1993 | Mueller et al. | ................ | 318/444 |
| 5,237,250 A * | 8/1993 | Zeile et al. | ..................... | 318/562 |
| 5,293,277 A * | 3/1994 | Shimazaki et al. | ............. | 360/64 |
| 5,313,648 A * | 5/1994 | Ehlig et al. | ..................... | 712/228 |
| 5,319,789 A * | 6/1994 | Ehlig et al. | ..................... | 712/228 |
| 5,319,792 A * | 6/1994 | Ehlig et al. | ..................... | 712/228 |
| 5,349,687 A * | 9/1994 | Ehlig et al. | ..................... | 704/231 |
| 5,550,993 A * | 8/1996 | Ehlig et al. | ..................... | 712/229 |
| 5,579,218 A * | 11/1996 | Ehlig et al. | ......................... | 700/1 |
| 5,579,497 A * | 11/1996 | Ehlig et al. | ......................... | 375/222 |
| 5,583,767 A * | 12/1996 | Ehlig et al. | ........................ | 701/1 |
| 5,617,574 A * | 4/1997 | Boutaud et al. | ................ | 712/200 |
| 5,652,910 A * | 7/1997 | Boutaud et al. | ................ | 712/218 |
| 5,829,054 A * | 10/1998 | Ehlig et al. | ..................... | 711/202 |
| 5,852,354 A | 12/1998 | Andrews | | |
| 5,952,806 A * | 9/1999 | Muramatsu | .............. | 318/568.12 |
| 6,157,089 A * | 12/2000 | Xu | ................................ | 307/9.1 |
| 6,373,299 B1 * | 4/2002 | Strecker | ........................ | 327/112 |
| 7,180,257 B1 * | 2/2007 | Schneider et al. | ........ | 318/400.09 |
| 7,183,736 B1 * | 2/2007 | Chou et al. | .................... | 318/575 |
| 2002/0158592 A1* | 10/2002 | Kaufhold et al. | ............. | 318/34 |
| 2002/0181595 A1* | 12/2002 | Obata et al. | ............. | 375/240.25 |
| 2003/0228097 A1* | 12/2003 | Devenyi et al. | ................. | 385/31 |
| 2004/0012357 A1* | 1/2004 | Takeuchi et al. | ................ | 318/479 |
| 2004/0199674 A1 | 10/2004 | Brinkhus | | |
| 2004/0232864 A1* | 11/2004 | Sunaga et al. | ................ | 318/434 |
| 2005/0110441 A1* | 5/2005 | Chen et al. | ..................... | 318/112 |
| 2006/0250878 A1* | 11/2006 | Snider | ...................... | 365/230.02 |
| 2006/0266273 A1* | 11/2006 | Westberg et al. | ............ | 116/62.1 |
| 2007/0075656 A1* | 4/2007 | Moller et al. | .................... | 318/77 |
| 2007/0075657 A1* | 4/2007 | Moller et al. | .................... | 318/77 |
| 2007/0075660 A1* | 4/2007 | Moller et al. | ................... | 318/254 |
| 2008/0272715 A1* | 11/2008 | Moller et al. | .................... | 318/34 |
| 2009/0039821 A1* | 2/2009 | Huang et al. | .................. | 318/625 |
| 2009/0058702 A1* | 3/2009 | Sugihara et al. | .............. | 341/141 |
| 2009/0108789 A1* | 4/2009 | Bliley et al. | .................... | 318/494 |
| 2009/0128080 A1* | 5/2009 | Cheng et al. | .................. | 318/625 |
| 2009/0155673 A1 | 6/2009 | Northcott | | |
| 2009/0189550 A1* | 7/2009 | Sun et al. | ........................ | 318/51 |
| 2010/0141032 A1 | 6/2010 | Joos et al. | | |

FOREIGN PATENT DOCUMENTS

| | | |
|---|---|---|
| EP | 0 628 647 | 12/1994 |
| EP | 1040395 B1 | 6/2004 |
| EP | 1 450 223 | 8/2004 |
| EP | 1450223 | 8/2004 |
| JP | 10-42592 | 2/1998 |
| JP | 11220653 A | 8/1999 |
| JP | 2001-161095 | 6/2001 |
| JP | 2001510678 A | 7/2001 |
| JP | 2003111467 A | 4/2003 |
| JP | 2004193788 | 7/2004 |
| JP | 2005114459 | 4/2005 |
| JP | 2008022557 | 1/2008 |
| JP | 5603187 B2 | 4/2012 |
| RU | 2125762 | 1/1999 |
| SU | 1527702 | 12/1989 |
| WO | 2004090496 A3 | 10/2004 |

* cited by examiner

STEPPER MOTOR CONTROLLER

CROSS REFERENCE TO RELATED APPLICATIONS

This is a U.S. national stage of application No. PCT/US2009/061581, filed on Oct. 22, 2009.

BACKGROUND OF THE INVENTION

1. Field of the Invention

The present application relates to a method and apparatus for controlling more than one stepper motor using a single set of micro-controller outputs.

2. Detailed Description of Prior Art

In modern mechanical applications where precision turning is required it is known to use a stepper motor. A stepper motor operates by turning a shaft of the stepper motor a precise angle each time a positive pulse is received at the motor's input and by turning the shaft an equal angle in the opposite direction each time a negative pulse is received. Each of these partial turns is a referred to as a "step." Stepper motors can have a varied number of steps per full revolution depending on the precision desired.

A stepper motor is ideal for uses requiring a high degree of precision, while not requiring a high magnitude of torque. A typical use meeting these criteria would be a gauge such as a fuel gauge or a coolant gauge in a vehicle. In these and similar cases it is desirable that the readings are accurate, and that instructions from a controller are interpreted precisely and identically each time they are sent in order to provide accurate feedback to an operator.

One disadvantage of using a stepper motor instead of a standard motor is that the control scheme of a stepper motor is more complex than that of a standard motor and requires more control signals from a controller. Additionally, due to the pulsed nature of a stepper motor control signal, a pulse width modulator is typically required to achieve accurate stepper motor controls.

As a practical rule all systems have a physical limit on the number of stepper motors they can control with a single micro-controller. Typically this limit is defined by the number of output pins on the micro-controller design selected for the system. For example, if a micro-controller design has eight output pins it can typically control a maximum of two stepper motors using a closed loop control scheme. When multiple stepper motors are used in a given system it is often the case that the required number of stepper motor control inputs will exceed the possible micro-controller outputs. It is known in the art to introduce additional micro-controllers when a single micro-controller cannot provide enough output pins.

A typical stepper motor utilizes two micro-controller outputs if it is controlled with an open loop or four micro-controller outputs if it is controlled with a closed loop. In a closed loop control scheme, two of the four pins are utilized for pulse signals, and two of the four pins are used for the feedback control. Devices using enough stepper motors to require multiple micro-controllers are common in the art.

It is desirable to minimize the number of micro-controllers contained in a particular device, however current systems do not have a way to reduce the number of microcontrollers and, at the same time, adequately control the required stepper motors.

SUMMARY OF THE INVENTION

Disclosed is an apparatus and method for controlling a plurality of stepper motors using a single set of micro-controller output pins. The micro-controller outputs a multiplexed control signal that is then demultiplexed in a demultiplexer. The demultiplexer outputs a stepper motor control signal corresponding to each stepper motor, and transmits the stepper motor control signals to the stepper motors.

These and other features of the present invention can be best understood form the following specification and drawings, the following of which is a brief description.

DETAILED DESCRIPTION OF THE PREFERRED EMBODIMENT

Figure 1:
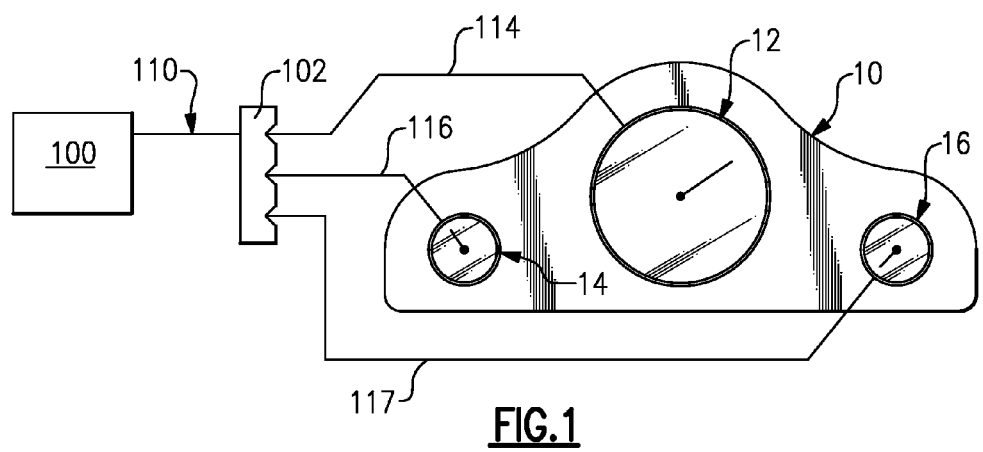
FIG. 1 is a gauge assembly having multiple gauges controlled by a single set of micro-controller outputs.
Figure 2:
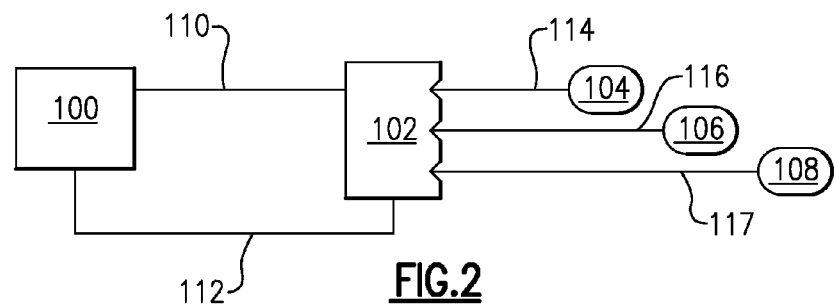
FIG. 2 is an apparatus for controlling multiple stepper motors with a single set of micro-controller outputs.

Vehicle gauge assemblies often incorporate multiple gauges having independent readouts such as a fuel level gauge, an oil temperature gauge, a speedometer, a tachometer, etc. Typically each of these gauges will contain a stepper motor controlled by a set of micro-controller outputs. FIG. 1 illustrates an example vehicle gauge assembly 10 according to the present application which uses a single set of micro-controller outputs 110 from a micro-controller 100 to control multiple gauges 12, 14, 16. The single set of micro-controller outputs 110 of FIG. 2 are split into individual control signals in a demultiplexer 102 which then transmits the control signals 114, 116, and 117 to each of the gauges 12, 14, 16. Each of the gauges 12, 14, 16 of FIG. 1 contains a stepper motor 104, 106, 108 (see FIG. 2) which is used to turn a pointer. In the example embodiment of FIGS. 1, 2, and 3 the first stepper motor 104 is a component of the first gauge 12, the second stepper motor 106 is a component of the second gauge 14, and the third stepper motor 108 is a component of the third gauge 16.

It is recognized that alternate designs for gauge assemblies using stepper motor driven gauges could be constructed and still fall within the disclosure of this application. The method described herein is preferred for uses where the pointer is not moving very often (i.e., gauges which do not need frequent updating) such as fuel gauges, oil temperature gauges, or other similar gauges.

In order to control a typical stepper motor, a micro-controller must either output a pulse width modulated control signal or pass a control signal through a pulse width modulator prior to the control signal reaching its destination. Once the signal is pulse width modulated, the signal can be used to accurately control a single stepper motor with no further conditioning. In order to independently control multiple stepper motors, additional control signals are typically required. Historically, the requirement for additional control signals has meant that more micro-controller outputs, and consequently more micro-controllers, are also required. In FIG. 2, multiple stepper motors are controlled using a single set of control signals output from the micro-controller.

FIG. 2 illustrates a device for controlling multiple stepper motors with a single set of micro-controller outputs that includes a micro-controller 100 that outputs a multiplexed control signal 110 and a demultiplexer control signal 112. The multiplexed control signal of FIG. 2 is pulse width modulated. A demultiplexer 102 accepts the multiplexed control signal 110 at its primary input, and the demultiplexer control signal 112 at a control input. The demultiplexer 102 utilizes information within the demultiplexer control signal 112 to demultiplex the control signal 110. Once the control signal 110 is demultiplexed the demultiplexer 102 outputs a control signal 114, 116, 117 to a designated stepper motor 104, 106, 108. Alternatively, the demultiplexer control signal 112 can be omitted and the demultiplexer 102 can use internal programming to perform the demutliplexing operation.

Figure 3:
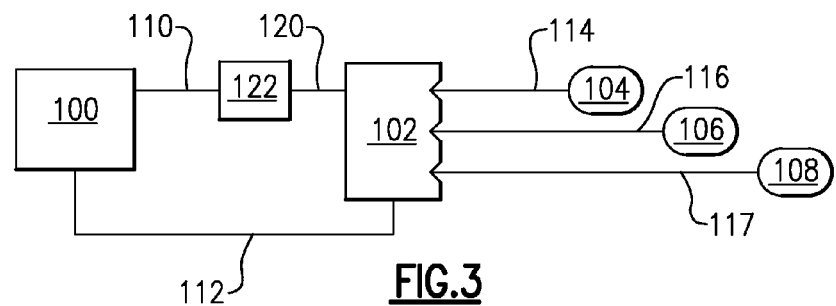
FIG. 3 is an apparatus for controlling multiple stepper motors with a single set of micro-controller outputs.

FIG. 3 illustrates another example device for controlling multiple stepper motors with a single set of micro-controller outputs. The example of FIG. 3 includes the micro-controller 100 which outputs a multiplexed control signal 110, as well as a demultiplexer control signal 112. The multiplexed control signal 110 is sent to a pulse width modulator 122 where it is converted into a pulse width modulated signal 120. The pulse width modulated signal is utilized to control the stepper motors 104, 106, 108. The pulse width modulated signal 120 is then accepted by the demultiplexer 102. The demultiplexer 102 also accepts the demultiplexer control signal 112. Once both signals 120, 112 have been accepted by the demultiplexer 102 the device operates in an identical fashion as the device of FIG. 2.

The illustrated examples include three stepper motors 104, 106, 108 being controlled using a single set of micro-controller outputs; however any number of stepper motors could be controlled in the same manner. The multiple controlled stepper motors 104, 106, 108 can be used to control any number of devices according to known methods. One application of systems such as the ones illustrated in FIGS. 2 and 3 is to control a needle on multiple gauges (such a fuel gauge) in a vehicle, while at the same time minimizing cost by utilizing a single micro-controller.

The control of multiple stepper motors 104, 106. 108 with a single set of micro-controller signals 110 can be achieved through a method known in the art as multiplexing. Multiplexing refers to combining multiple signals into a single data stream. This is typically coupled with a demultiplexing operation on a receiver end where the single data stream is split into multiple signals. A group of signals may either be output individually and then combined in a multiplexer component, or output by a controller as a single multiplexed signal. A method for performing multiplexing is illustrated in FIG. 4, and a second method for performing multiplexing is illustrated in FIG. 5.

Figure 4:
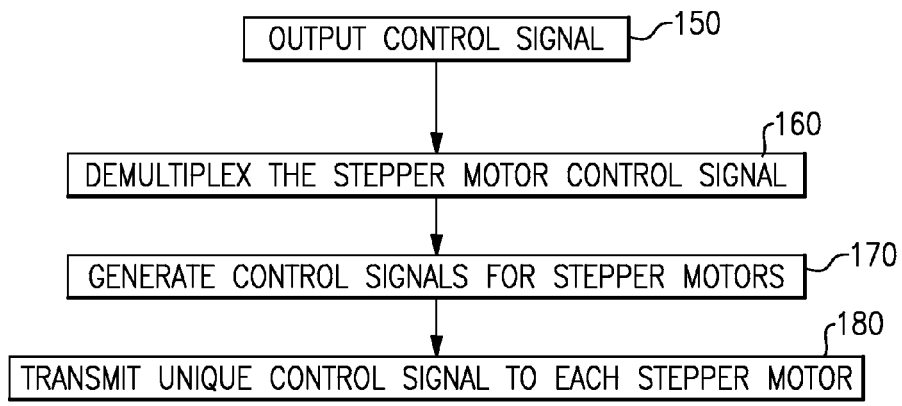
FIG. 4 is a flowchart illustrating a method for controlling multiple stepper motors with a single set of micro-controller outputs.
Figure 5:
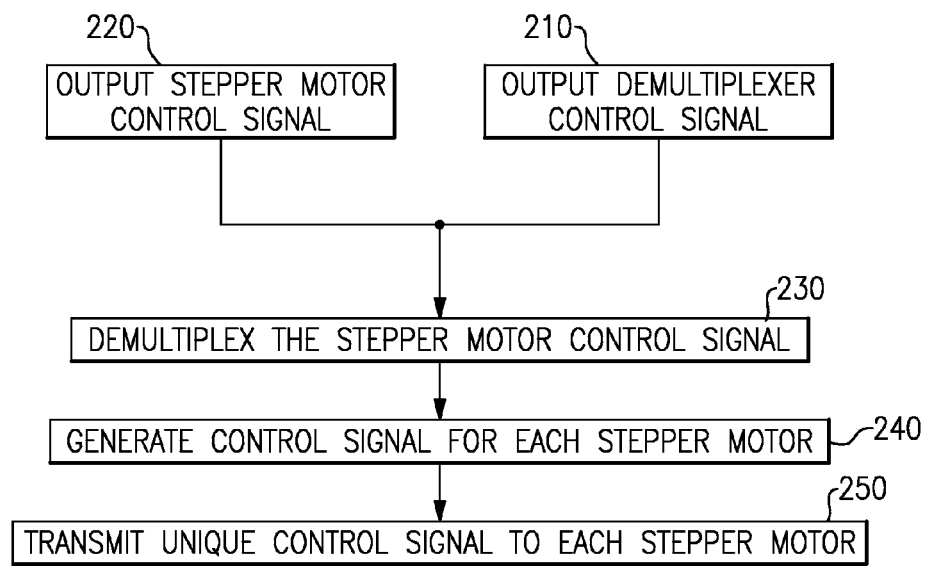
FIG. 5 is a flowchart illustrating a method for controlling multiple stepper motors with a single set of micro-controller outputs.

The method of FIG. 4 begins by initially outputting a set of multiplexed control signals 110 containing control information for a plurality of stepper motors 104, 106, 108 from a single set of output pins to a demultiplexer 102 (Step 150). The demultiplexer 102 then demultiplexes the signal 110 by splitting the information contained on the control signal 110 into multiple individual control signals (step 160). Once the control signal 110 has been demultiplexed, the demultiplexer 102 generates a unique control signal 114, 116, 117 for each stepper motor (step 170) and transmits the unique control signals 114, 116, 117 to the corresponding stepper motor 104, 106, 108 (step 180).

The demultiplexer 102 then determines which stepper motor control signal 114, 116, 117 a time period applies to and sends all control signals 110 received from the microcontroller 100 within that time period to the designated stepper motor 114, 116, 117. The example method of FIG. 2 operates using a sequence of three time periods, where the microcontroller 100 outputs a multiplexed control signal 110 containing a control signal for the first stepper motor 104 during a first time period, outputs a multiplexed control signal 110 containing a control signal for the second stepper motor 106 during a second time period, and outputs a multiplexed control signal 110 containing a control signal for the third stepper motor 108 during a third time period. The time period used may be any time period that suits the desired application. The sequence then repeats, thereby allowing the three stepper motors 104, 106, 108 to be continuously controlled with a single set of micro-controller output pins.

Once the corresponding stepper motor 104, 106, 108 for a time period has been determined, the demultiplexer 102 outputs the individual control signal 114, 116, 117 only at an output connected to the corresponding stepper motor 104, 106, 108. In this way the example method of FIG. 4 controls each stepper motor 104, 106, 108 with updates during the stepper motor's designated time period each time the sequence repeats.

Another example method uses a demultiplexer control signal 112 instead of the predefined time period of the above described embodiment and is illustrated in FIG. 5. In the method of FIG. 5, a micro-controller 100 outputs a demultiplexer control signal 112 (step 210) simultaneously with a stepper motor control signal 110 (step 220). The demultiplexer control signal 112 contains instructions for a demultiplexer 102 so that demultiplexer 102 can determine to which stepper motor 104, 106, 108 a portion of the stepper motor control signal 110 received from the micro-controller 100 corresponds. The demultiplexer 102 then demultiplexes the control signal 110 (step 230) and generates an individual control signal 114, 116, 117 for each stepper motor 104, 106, 108 (step 240). Once the control signals 114, 116, 117 have been generated, the demultiplexer 100 sends the corresponding control signal 114, 116, 117 to each of the stepper motors 104, 106, 108 (step 250).

The method of FIG. 5 provides for instructing the demultiplexer 102 to send a portion of the multiplexed signal 110 to multiple stepper motors 104, 106, 108 simultaneously instead of sending the same control instruction on the multiplexed signal multiple times (as in the example method of FIG. 4). For example if the micro-controller 100 needs to turn stepper motors 104 and 102 one step it can send the instruction once and have the demultiplexer control single 112 indicate that the instruction should be sent to both stepper motors 102, 104. This provides the advantage of a faster response time and more efficient controls. The example methods of FIGS. 4 and 5 utilize a micro-controller 100 which outputs a pulse width modulated signal 110.

While two methods of demultiplexing a signal are described above, other known methods of demultiplexing a signal are within the contemplation of this invention.

Figure 6:
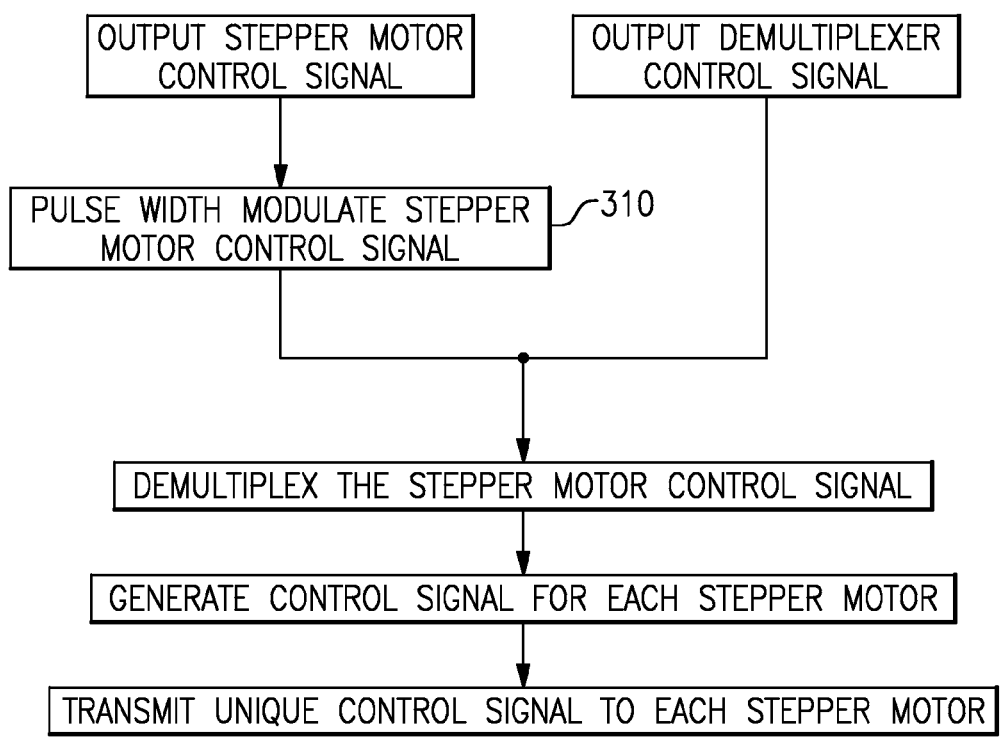
FIG. 6 is a flow chart illustrating a method using a pulse width modulator.

For a system where the micro-controller 100 does not output a pulse width modulated stepper motor control signal 110, and the stepper motors require a pulse width modulated control signal, an additional pulse width modulation step is performed between the micro-controller output and the demultiplexer input. Referring to FIG. 6, another example method provides a pulse width modulated step (step 310) where the micro-controller output 110 is converted into a pulse width modulated stepper motor control signal 120 using any known technique. The pulse width modulated stepper motor control signal 120 can then be properly interpreted by the stepper motors 104, 106, 108.

Although multiple embodiments of this invention have been disclosed, a worker of ordinary skill in this art would recognize that certain modifications would come within the scope of this invention. For that reason, the following claims should be studied to determine the true scope and content of this invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling a plurality of stepper motors comprising:
    receiving a multiplexed signal originating from a single set of microcontroller outputs, wherein the multiplexed control signal includes at least a first portion simultaneously communicating a single instruction for multiple stepper motors;
    demultiplexing the multiplexed control signal;
    deriving a plurality of stepper motor control signals, corresponding to a plurality of stepper motors, from the demultiplexed control signal; and
    transmitting each of the plurality of stepper motor control signals to a corresponding stepper motor.

2. The method of claim 1, further comprising receiving a demultiplexer control signal originating from the micro-controller.

3. The method of claim 2, wherein the demultiplexing of the multiplexed control signal further comprising utilizing information contained in the demultiplexer control signal to demultiplex the multiplexed signal.

4. The method of claim 1, wherein the multiplexed signal is a pulse width modulated signal.

5. The method of claim 1, wherein the multiplexed signal passes through a pulse width modulator prior to the step of receiving a multiplexed signal.

6. The method of claim 1, wherein the plural stepper motor control signals comprise at least two distinct stepper motor control signals.

7. The method of claim 6, wherein the transmitting of each of the plurality of stepper motor control signals comprises transmitting a distinct stepper motor control signal to each of the plural stepper motors.

8. The method of claim 1, wherein each of the plural of stepper motors controls at least one gauge in a vehicle.

9. An apparatus for controlling a plurality of stepper motors comprising:
    a micro-controller including at least one set of micro-controller output pins, wherein the micro-controller is operable to output a multiplexed control signal from a single set of the at least one set micro-controller output pins, and wherein the multiplexed control signal includes at least a first portion simultaneously communicating a single instruction for multiple stepper motors; and
    a demultiplexer communicatively coupled to a single set of micro-controller output pins of the micro-controller and communicatively coupled to the plurality of stepper motors.

10. The apparatus of claim 9, further comprising a pulse width modulator arranged between the micro-controller and a demultiplexer input.

11. The apparatus of claim 9, wherein the micro-controller comprises a demultiplexer control output, and the demultiplexer comprises a demultiplexer control input.

12. The apparatus of claim 11, further comprising a control signal connection between the demultiplexer control output and the demultiplexer control input.

13. The apparatus of claim 9, wherein the demultiplexer comprises a number of outputs at least equal to a number of the plural of stepper motors.

14. The apparatus of claim 9, wherein the plural stepper motors comprise at least one stepper motor controlling a gauge.

15. The apparatus of claim 9, wherein each of the plural stepper motors is connected to a respective gauge.

16. An instrument cluster assembly comprising:
    a micro-controller including at least one set of micro-controller output pins, wherein the micro-controller is operable to output a multiplexed control signal from a single set of the at least one set micro-controller output pins, and wherein the multiplexed control signal includes at least a first portion simultaneously communicating a single instruction for multiple stepper motors;
    a demultiplexer communicatively coupled to the single set of micro-controller output pins of the microcontroller and communicatively coupled to a plurality of gauges;
    each of the plural gauges comprising at least one stepper motor; and
    each of the stepper motors configured to be controlled by the micro-controller.

17. The device of claim 16, further comprising a pulse width modulator located between the micro-controller and a demultiplexer input.

18. The device of claim 16, wherein the micro-controller comprises a demultiplexer control output, and the demultiplexer comprises a demultiplexer control input.

19. The device of claim 18, wherein the demultiplexer comprises a number of outputs at least equal to the number of the plural gauges.

20. The device of claim 16, further comprising a control signal connection between the demultiplexer control output and the demultiplexer control input.

* * * * *